UNITED STATES PATENT OFFICE.

HEINRICH STOLLWERCK, OF COLOGNE-ON-THE-RHINE, PRUSSIA, GERMANY, ASSIGNOR TO GEBR. STOLLWERCK, OF SAME PLACE.

PREPARING SOLUBLE COCOA.

SPECIFICATION forming part of Letters Patent No. 401,311, dated April 9, 1889.

Application filed September 26, 1887. Renewed October 11, 1888. Serial No. 287,859. (No model.)

*To all whom it may concern:*

Be it known that I, HEINRICH STOLLWERCK, of the city of Cologne-on-the-Rhine, in the Kingdom of Prussia and German Empire, have invented a certain new and useful Improvement in the Method of Treating Powdered Cocoa, of which the following is a specification.

This invention relates to an improved method of preparing cocoa; and its object is to prepare the cocoa in the shape of solid but easily-soluble pieces, which are handy to carry along for traveling and numerous other purposes.

Heretofore cocoa in the trade could only be had in the powdered state, which rendered it very unhandy for carrying along in suitable quantities when out traveling for any length of time, &c., as it always required a certain amount of available space in order to be taken along in sufficient quantities, so as to be kept fresh and not to lose its flavor.

The present invention, therefore, consists in first treating the powdered cocoa with alcohol, and then pressing it into solid pieces of any desired shape in suitable molds, and at the same time reducing its volume, the said molds being previously heated, or becoming heated through the pressure.

In carrying into effect the said improved method, powdered cocoa—preferably such as is known in the trade as "cocoa freed of oil," but which may or may not contain an admixture of sugar or other materials—is first impregnated with alcohol. It is then put into suitable molds, and there, by means of a hydraulic press or other suitable mechanical means, pressed into any desired shape, according to the shape of the mold and corresponding ram, the said mold having been previously heated, or becoming heated in consequence of and in accordance with the amount of pressure put on for the purpose. The pressure thus exerted, in conjunction with the alcohol with which the powdered cocoa is impregnated, cause the cocoa-butter in the mass to be forced out. The alcohol very quickly evaporating under the influence of the heat in the molds, and the cocoa-butter already hardening again at a temperature of 25° centigrade, the cocoa-butter thus forced out of the powdered mass will form a thin layer around the outer surfaces of the solid pieces of cocoa thus formed in the molds. After thereupon being taken out of the molds the solid pieces are left to cool. The pieces of cocoa thus obtained will be found much handier for all purposes than powder, being cleaner in use and taking up much less space, to be readily soluble in hot water and not to leave any unsoluble residue. Being surrounded by an air-tight coating of hard cocoa-butter, they will most effectually resist the damaging influences of the atmosphere, dampness, maggots, &c. Their flavor will be retained, even if kept for some length of time. Another advantage in using cocoa in this shape is that one may always be sure of taking the same quantity for each cup, and thus securing a well-prepared and equally palatable drink each time.

Instead of impregnating the powdered cocoa with alcohol, ether may be used for the same purpose, as cocoa-butter will thoroughly dissolve in ether, and may thus be readily forced out by pressure. The ether then quickly evaporating in consequence of the prevailing heat, the cocoa-butter will soon be transformed again into its undissolved state, so as to surround the cocoa with a hard coating.

Having thus described my invention, what I claim as new, and desire to secure by Letters Patent, is—

1. The method set forth of preparing cocoa in solid plates or pieces readily soluble in boiling water, said method consisting in impregnating the powdered cocoa with a solvent of the fatty matter therein contained, and then pressing it in suitable molds, whereby the finished pieces are inclosed in an envelope of the hardened cocoa-butter, substantially as described.

2. The method set forth of preparing cocoa in solid plates or pieces readily soluble in boiling water, said method consisting in first impregnating the powdered cocoa with an alcoholic solvent, and then pressing the same in suitable heated molds, substantially as described.

In testimony whereof I have signed my name to this specification in the presence of two subscribing witnesses.

HEINRICH STOLLWERCK.

Witnesses:
   PETER H. HARWINTZ,
   FRIEDR. KRAUSE.